US007340474B2

(12) United States Patent
Coronado et al.

(10) Patent No.: US 7,340,474 B2
(45) Date of Patent: Mar. 4, 2008

(54) APPARATUS, SYSTEM, AND METHOD FOR RE-GENERATING DATA STRUCTURES

(75) Inventors: Juan Alonso Coronado, Tuscon, AZ (US); Jack Neil Licano, Jr., Tucson, AZ (US); Marlyn Quinones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 11/033,859

(22) Filed: Jan. 12, 2005

(65) Prior Publication Data

US 2006/0155736 A1 Jul. 13, 2006

(51) Int. Cl.
*G06F 17/30* (2006.01)
*G06F 7/00* (2006.01)
(52) U.S. Cl. .................... 707/101; 707/102; 707/10
(58) Field of Classification Search .......... 707/101, 707/10
See application file for complete search history.

(56) References Cited

U.S. PATENT DOCUMENTS

| 6,606,629 | B1* | 8/2003 | DeKoning et al. ........... 707/100 |
| 6,813,689 | B2* | 11/2004 | Baxter, III .................. 711/114 |
| 6,877,059 | B2* | 4/2005 | Solomon et al. ............ 710/305 |
| 7,203,844 | B1* | 4/2007 | Oxford ....................... 713/193 |
| 2004/0015762 | A1* | 1/2004 | Klotz et al. ................. 714/742 |
| 2004/0107400 | A1* | 6/2004 | Servi et al. .................. 714/800 |
| 2004/0181543 | A1* | 9/2004 | Wu et al. .................... 707/102 |

\* cited by examiner

*Primary Examiner*—Kuen S. Lu
(74) *Attorney, Agent, or Firm*—Kunzler & McKenzie (57) ABSTRACT

An apparatus, system, and method are disclosed for re-generating a data structure. A detection module detects corruption of a first data structure of a storage device. A removal module removes a first path from a host system to the first data structure without affecting communications through other paths between the host system and other data structures of the storage device. A path module establishes a second path from the host system to a second data structure of the storage device. A re-generation module generates the second data structure to replace the first data structure.

17 Claims, 7 Drawing Sheets

APPARATUS, SYSTEM, AND METHOD FOR RE-GENERATING DATA STRUCTURES

FIELD OF THE INVENTION

This invention relates to re-generating a data structure and more particularly relates to re-generating a specific data structure in a group of data structures without affecting communications with the other data structures.

DESCRIPTION OF THE RELATED ART

A host system such as a standalone computer, a server, or a mainframe computer stores software instructions in a storage device. The storage device may be a random access memory ("RAM"), a hard disk drive, and the like. Software instructions are often organized into a data structure. The data structure may define the physical or logical organization of the software instructions in the storage device.

The software instructions are typically loaded into the data structure of the storage device from a non-volatile storage device such as a hard disk drive. The storage device may also be controlled by a controller, with the controller managing the storage device for the host system.

The host system communicates with a data structure of the storage device through a data path or path, requesting and receiving software instructions through the path. The path as used herein refers to a communications channel such as a serial electronic data channel, a parallel electronic data bus, an optical data channel, a wireless data channel, and the like. In addition, the path may comprise one or more distinct physical and logical communications channels. The path physically and logically connects the host and storage device. The host system typically communicates with a plurality of data structures through a plurality of paths. Each data structure is created as part of a relationship of data structures and paths.

The plurality of paths may be organized as a path group. Communication between the host system and the data structures is typically managed by path group, with paths to the data structures being created and removed as group as each data structure accessed by a path is interrelated. Software instructions in the data structure may become corrupted. Corruption as used herein refers to the changing of stored software instructions that should not be changed. For example, software instructions may be accidentally or inadvertently overwritten by alternate instructions. Data structure software instructions may also be corrupted through a failure of a portion of the storage device.

The data structure may include a redundancy check. The redundancy check may be data derived from the software instructions in a manner such that the redundancy check can be used to validate the integrity of the software instructions and detect a corrupted data structure. For example, the redundancy check may be calculated by performing an exclusive or ("XOR") operation on each data word in a group of software instructions and storing the result as the redundancy check. The redundancy check may subsequently be used to validate that the software instructions of the data structure have not been corrupted by re-calculating the redundancy check value and comparing the re-calculated value with the stored redundancy check value. If the re-calculated redundancy check value is equivalent to the stored redundancy check value, the software instructions have likely not been corrupted.

Unfortunately, if a data structure is found to be corrupted, the plurality of data structures must be reloaded from the non-volatile storage device, paths created to each data structure, and a path group organized. Reloading the data structures, creating the paths, and organizing the paths into a path group as used herein is a failover. Performing the failover requires significant time because of the many data structures that must be reloaded, and the many paths that must be created and organized as a path group.

From the foregoing discussion, it should be apparent that a need exists for an apparatus, system, and method that detects a corrupted data structure and re-generates only the single data structure without affecting communications with other data structures. Beneficially, such an apparatus, system, and method would reduce the time required to recover from a corrupted data structure.

SUMMARY OF THE INVENTION

The present invention has been developed in response to the present state of the art, and in particular, in response to the problems and needs in the art that have not yet been fully solved by currently available data structure re-generation methods. Accordingly, the present invention has been developed to provide an apparatus, system, and method for re-generating a data structure that overcome many or all of the above-discussed shortcomings in the art.

The apparatus to re-generate a data structure is provided with a logic unit containing a plurality of modules configured to functionally execute the necessary steps of detecting a corrupted first data structure, removing a first path to the first data structure, establishing a second path to a second data structure, and generating the second data structure. These modules in the described embodiments include a detection module, a removal module, a path module, and a re-generation module.

The detection module detects corruption of a first data structure. The first data structure is configured to organize software instructions. In one embodiment, the first data structure is configured as a data block. In an alternate embodiment, the first data structure is configured as a file. The removal module removes a first path from a host system to the first data structure without affecting communications through other paths between the host system and other data structures. In one embodiment, the removal module removes the first path from a path group, the path group remaining intact and functional. The path module establishes a second path from the host system to a second data structure. In one embodiment, the path module incorporates the second path into the path group. The re-generation module generates the second data structure.

In one embodiment, the removal module comprises a request module, a notification module, and a verification module. The request module requests the host system to remove the first path. The notification module notifies the host system of a state change. In addition, the verification module verifies that the first path is removed. The apparatus detects corruption in a first data structure, removes the first data path to the first data structure, establishes a second path to a second data structure, and generates the second data structure to replace the first data structure.

A system of the present invention is also presented to re-generate a data structure. The system may be embodied in a computer system. In particular, the system, in one embodiment, includes a storage device, a host system, and a management module comprising a detection module, a removal module, a path module, and a re-generation module.

The host system communicates with a first data structure of the storage device through a first path. In one embodiment, the management module is a controller controlling the storage device. The detection module detects corruption of a first data structure. The removal module removes the first path from the host system to the first data structure. The path module establishes a second path from the host system to a second data structure in the storage device and the re-generation module generates the second data structure.

In one embodiment, the system includes a non-volatile storage device that stores software instructions and the like. The software instructions of the first data structure may be initially loaded from the non-volatile storage device to the first data structure. The re-generation module generates the second data structure from the stored software instructions of the non-volatile storage device to replace the first data structure.

A method of the present invention is also presented for re-generating a data structure. The method in the disclosed embodiments substantially includes the steps necessary to carry out the functions presented above with respect to the operation of the described apparatus and system.

A detection module detects corruption of a first data structure. A removal module removes a first path from a host system to the first data structure without affecting communications between the host system and other data structures. A path module establishes a second path from the host system to a second data structure. In addition, the re-generation module generates the second data structure to replace the first data structure.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention detects a corrupted first data structure, removes a first path to the first data structure, and establishes a second path to a second data structure without affecting communications with other data structures through other paths. In addition, the present invention generates the second data structure, eliminating the need for a failover operation. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
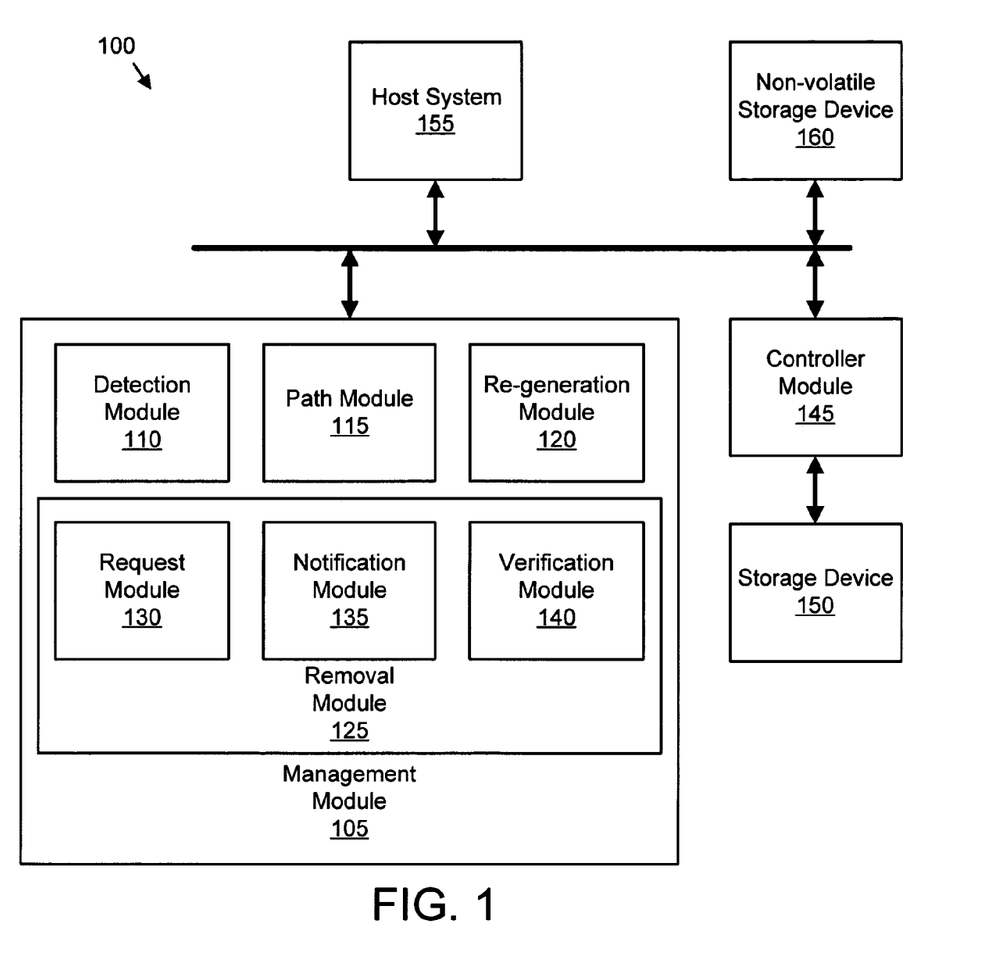
FIG. 1 is a schematic block diagram illustrating one embodiment of a re-generating system in accordance with the present invention.

FIG. 1 is a schematic block diagram illustrating one embodiment of a re-generating system 100 of the present invention. The system 100 includes a storage device 150, a controller module 145, a non-volatile storage device 160, a host system 155, and a management module 105 comprising a detection module 110, a removal module 125, a path module 115, and a re-generation module 120. In the depicted embodiment, the removal module 125 comprises a request module 130, a notification module 135, and a verification module 140. Although the system 100 depicts one storage device 150, one controller module 145, one non-volatile storage device 160, and one host system 155, any number of storage devices 150, controller modules 145, non-volatile storage devices 160, and host systems 155 may be employed.

The host system 155 communicates with a first data structure of the storage device 150 through a first path. The first data structure is configured to organize software instructions. In one embodiment, the first data structure is configured as a data block. In an alternate embodiment, the first data structure is configured as a file.

The first path may be a dedicated communication channel such as an electronic serial channel or an optical fiber channel, a network communication channel such as an Ethernet communications channel, or the like. In addition, the first path may comprise one or more software values, memory registers, and software programs configured to facilitate communications.

In the depicted embodiment, the host system 155 communicates through the controller module 145 to the storage device 150. The host system 155 retrieves software instructions from the first data structure through the path. In one embodiment, the first path is included in a path group comprising one or more paths. The paths of the path group may share one or more communications channels, software values, memory registers, and software programs. In addition, each path of the path group may provide communications between the host system 155 and a unique data structure of a plurality of data structures comprising software instructions. In a certain embodiment, data from the non-volatile storage device 160 is initially copied to each data structure.

The first data structure includes a redundancy check. The redundancy check is calculated from the software instructions of the first data structure and may be used to verify that the data of the first data structure has not been corrupted. In one embodiment, the redundancy check is calculated when data is copied to the first data structure.

For example, the software instructions of the first data structure may be XORed together to form a first redundancy check value that may be stored in the first data structure. Subsequently, the detection module 110 may XOR the software instructions of the first data structure together to form a second redundancy check value. If the stored first redundancy check value is equal to the second redundancy check value, the software instructions of the first data structure have likely not been corrupted since the first redundancy check value was calculated. However, if the first and the second redundancy check values are not equal, the software instructions of the first data structure have been corrupted since the first redundancy check value was calculated.

In the past, if a data structure of the storage device 150 was found to be corrupted, each data structure has typically been erased from the storage device 150, the data structures recreated along with paths to the data structures, and the software instructions again copied from the non-volatile storage device 160 to the data structures, an operation typically referred to as a failover. However, the present invention removes the path to the first data structure without affecting communications between the host system 155 and other data structures, and re-generates a replacement data structure without interrupting the operation of any other data structures or paths.

The detection module 110 detects corruption of the first data structure. The removal module 125 removes the first path from the host system 155 to the first data structure. The path module 115 establishes a second path from the host system 155 to a second data structure in the storage device 150 and the re-generation module 120 generates the second data structure. In one embodiment, the re-generation module 120 generates the second data structure from the stored software instructions of the non-volatile storage device 160 to replace the first data structure.

Figure 2:
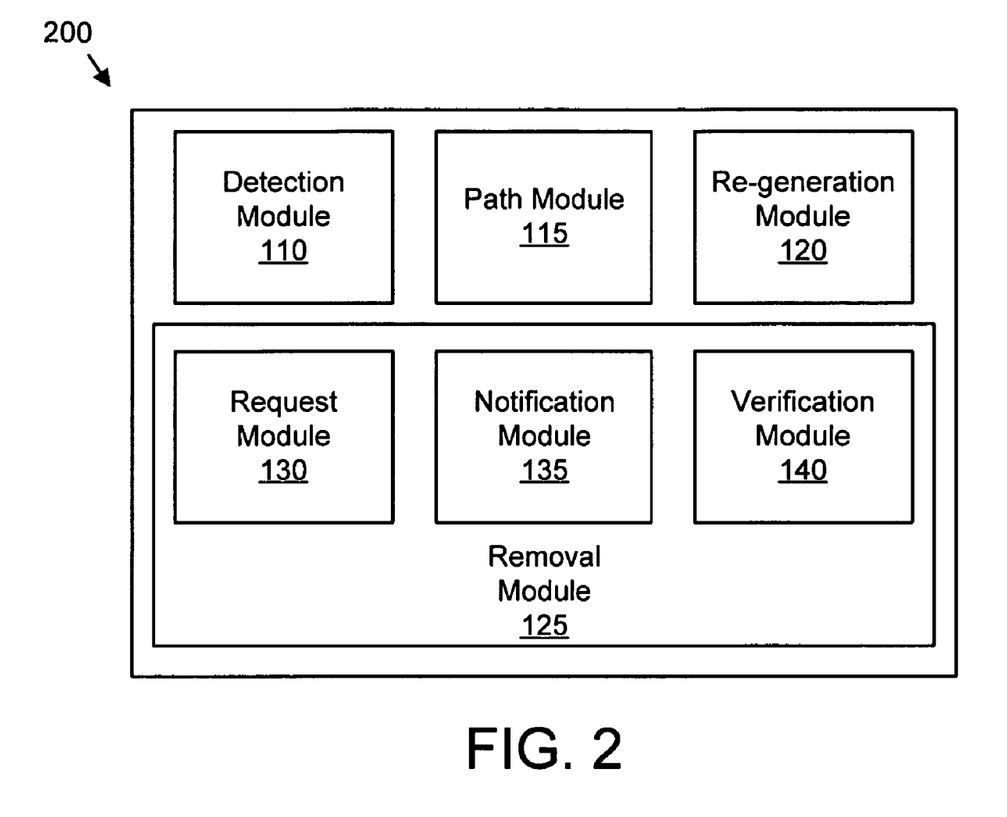
FIG. 2 is a schematic block diagram illustrating one embodiment of a re-generating apparatus of the present invention.

FIG. 2 is a schematic block diagram illustrating one embodiment of a re-generating apparatus 200 of the present invention. The apparatus 200 includes a detection module 110, a removal module 125, a path module 115, and a re-generation module 120. In the depicted embodiment, the removal module 125 further comprises a request module 130, a notification module 135, and a verification module 140.

The detection module 110 detects corruption of a first data structure. In one embodiment, the detection module 110 detects the corruption by comparing a stored first redundancy check stored in the first data structure with a second redundancy check value calculated from the data of the first data structure. The removal module 125 removes a first path from a host system 155 to the first data structure. In addition, the removal module 125 removes the first path without affecting communications through other paths to other data structures. In one embodiment, the removal module 125 removes the first path from a path group, the path group remaining intact and functional.

in one embodiment, the request module 130 requests the host system 155 to remove the first path. The request module 130 may communicate a digital message to the host system 155 to request the host system 155 remove the first path. The digital message may comprise a path identifier that identifies the first path and a request indicator that is interrupted by the host system 155 as a request to remove the path identified by the path identifier.

In one embodiment, the notification module 135 notifies the host system 155 of a state change. For example, the notification module 135 may notify the host system 155 that the state of the first data structure is changed from an available state to an unavailable state. In one embodiment, the verification module 140 verifies that the first path is removed. The path module 115 establishes a second path from the host system 155 to a second data structure. In one embodiment, the path module 115 creates the second data structure. In addition, the path module 115 may incorporate the second path into a path group without interrupting communications through the paths of the path group.

The re-generation module 120 generates the second data structure. In one embodiment, the re-generation module 120 copies the software instructions of the first data structure from the non-volatile storage device 160 to the second data structure. In an alternate embodiment, the re-generation module 120 requests that an administer identify a source of the software instructions for the second data structure. The re-generation module 120 may also request that a storage media such as a compact disk ("CD") or magnetic tape containing the software instructions be mounted on a removable media storage device such as a CD drive or a magnetic tape drive, and may further copy the software instructions from the storage media to the second data structure. The apparatus 200 re-generates the corrupted first data structure as the second data structure with a path to the host system 155.

Figure 3:
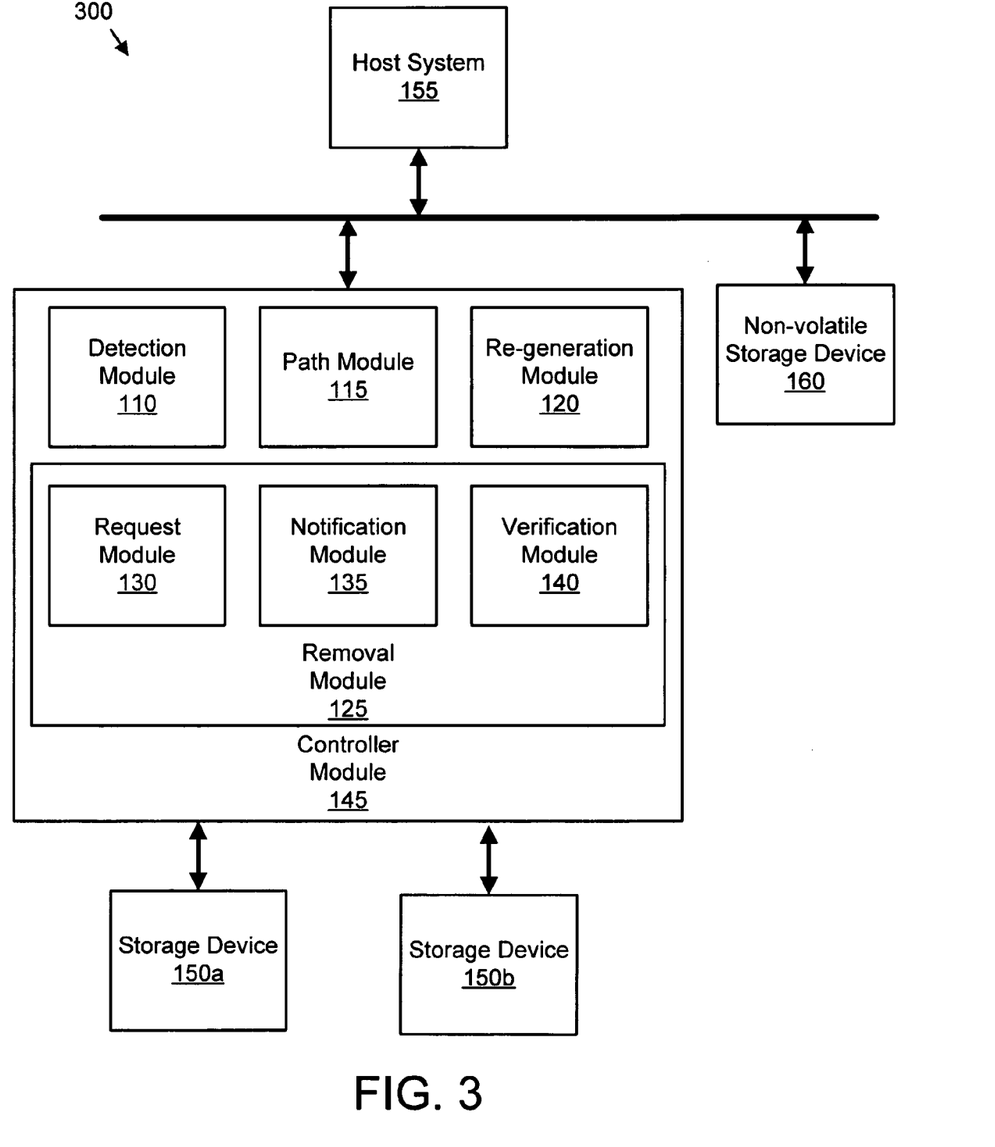
FIG. 3 is a schematic block diagram illustrating one embodiment of a controller-based re-generating system of the present invention.

FIG. 3 is a schematic block diagram illustrating one embodiment of a controller-based re-generating system 300 of the present invention. A controller module 145 comprises the elements of the management module 105 illustrated in FIG. 1. The controller module 145 controls one or more storage devices 150. A host system 155 may store and retrieve data to the storage device 150 through the controller module 145. In the depicted embodiment, the host system 155 retrieves software instructions residing in one or more data structures from the storage device 150.

As depicted, the controller module 145 comprises a detection module 110, a removal module 125, a path module 115, and a re-generation module 120. The detection module 110, removal module 125, path module 115, and re-generation module 120 re-generate a corrupted data structure as described in FIGS. 1 and 2.

Figure 4:
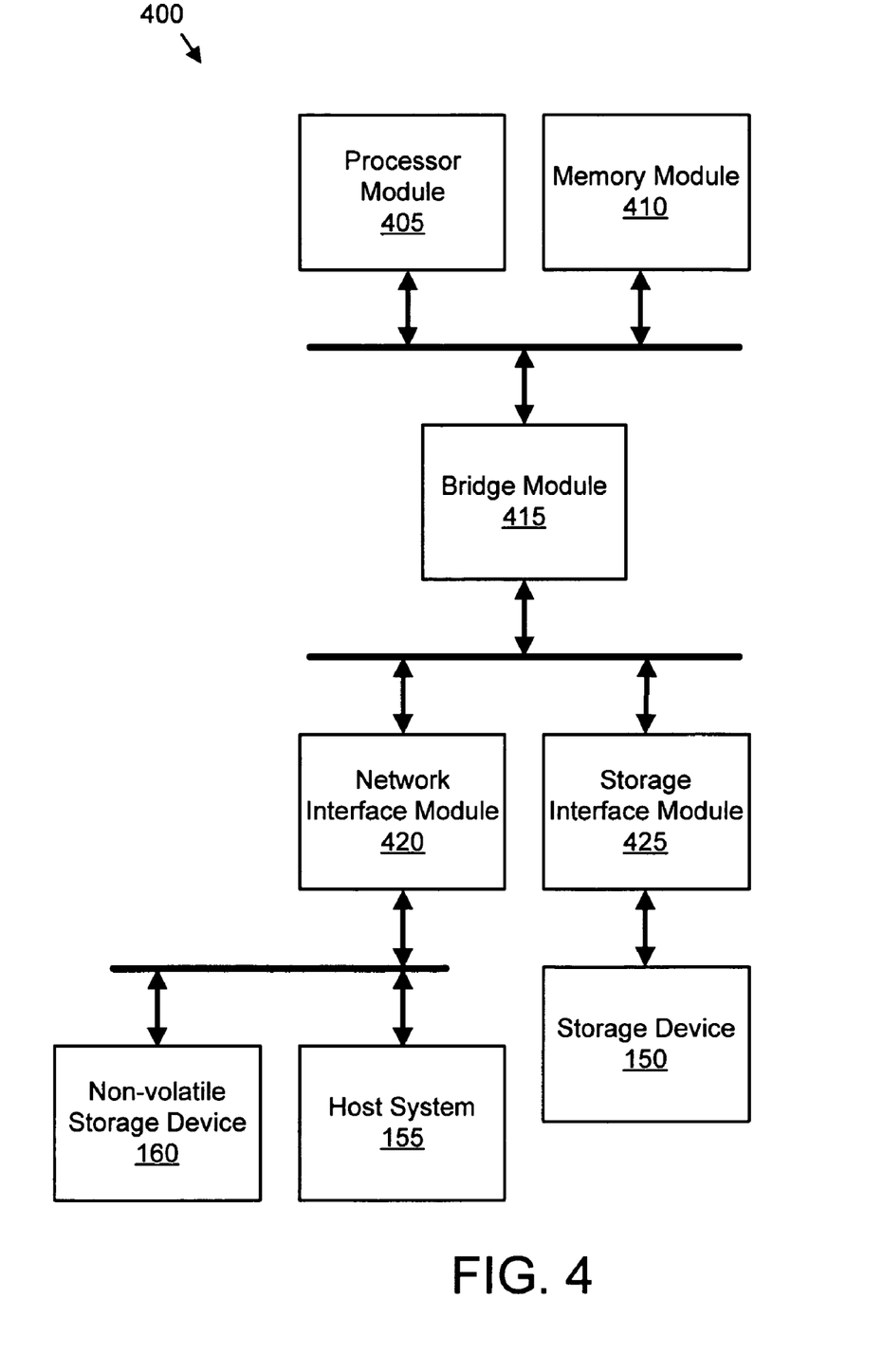
FIG. 4 is a schematic block diagram illustrating one embodiment of a management module of the present invention.

FIG. 4 is a schematic block diagram illustrating one embodiment of a management module 400 of the present invention. The management module 400 includes a processor module 405, a memory module 410, a bridge module 415, a network interface module 420, and a storage interface module 425. The memory module 410 stores software instructions and data. The processor module 405 executes the software instructions and processes the data as is well known to those skilled in the art. The processor module 405 communicates with the network interface module 420 and the storage interface module 425 through the bridge module 415.

In one embodiment, the network interface module 420 is configured as a plurality of semiconductor gates fabricated as an Ethernet interface or the like. The processor module 405 may communicate through the network interface module 420 to the host system 155. In one embodiment, the storage interface module 425 is configured as interface card such as a Fibre Channel interface card. The processor module 405 also communicates through the storage interface module 425 to one or more storage devices 150. In addition, the storage device 150 may communicate software instructions through the storage interface module 425 and the network interface module 420 to the host system 155.

In one embodiment, the detection module 110, the path module 115, the re-generation module 120, and the request module 130, the notification module 135, and verification module 140 of the removal module 125 are software programs executed by the processor module 405. For example, the processor module 405 executing the detection module 110 may calculate a redundancy check value for a first data structure by retrieving the software instructions of the first data structure from the storage device 150 through the storage interface module 425 and XORing the software instructions. The processor module 405 may further retrieve a stored redundancy check value from the first data structure and compare the calculated redundancy check value with the stored redundancy check value to determine if the first data structure is corrupted.

In one embodiment, the processor module 405 executing the removal module 125 communicates with the host system 155 through the network interface module 420 to remove the first path to first data structure. In addition, processor module 405 executing the path module 115 may create a second data structure in the storage device 150 through the storage interface module 425 and establish a second path from the host system 155 to the second data structure by communicating with the host system through the network interface module 420. The processor module 405 executing the re-generation module 120 may also generate the second data structure by copying software instructions from a non-volatile storage device 160 through the network interface module 420 and the storage interface module 425 to the second data structure of the storage device 150.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
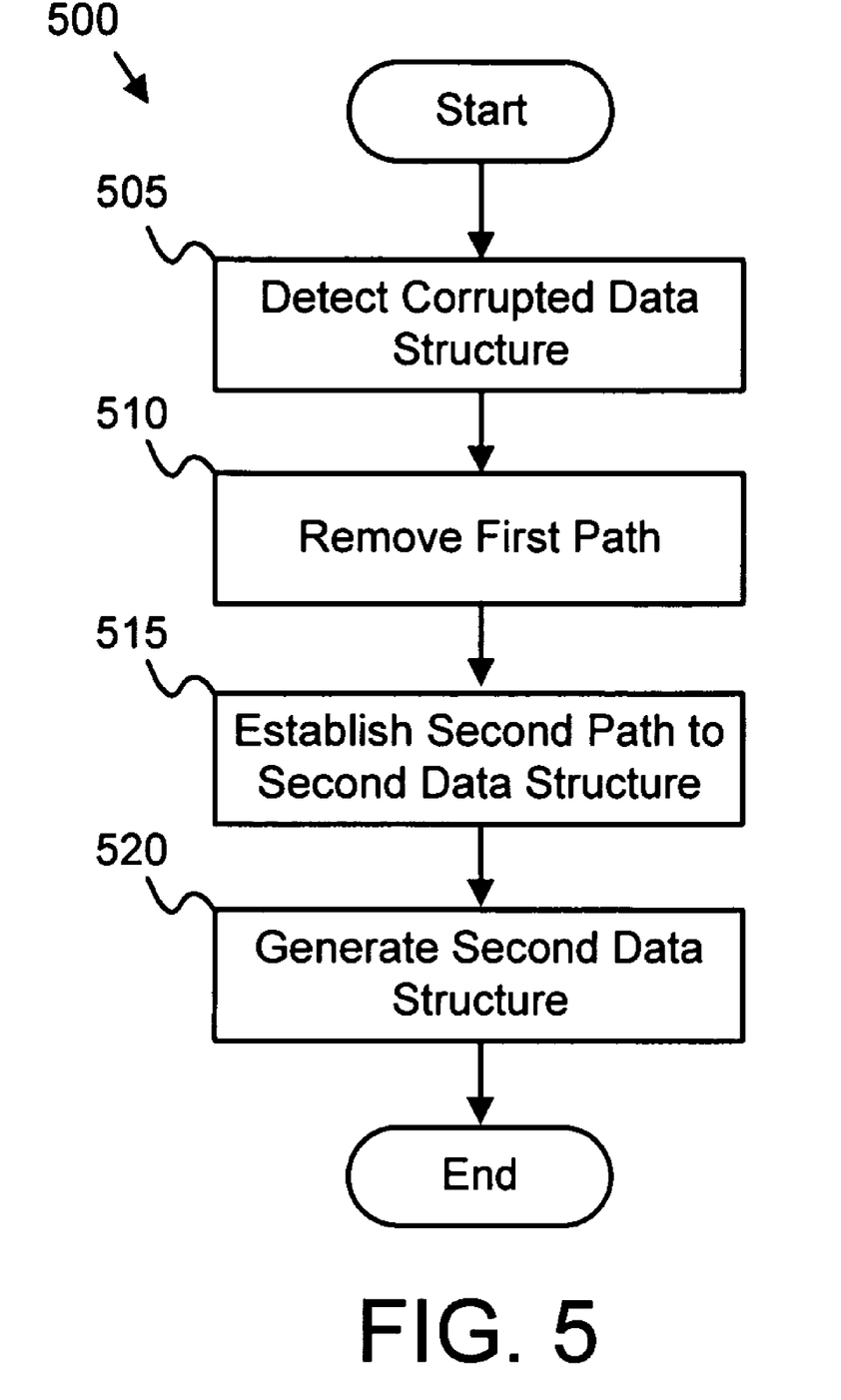
FIG. 5 is a schematic flow chart diagram illustrating one embodiment of a re-generation method in accordance with the present invention.

FIG. 5 is a schematic flow chart diagram illustrating one embodiment of a re-generation method 500 in accordance with the present invention. A detection module 110 detects 505 corruption of a first data structure. In one embodiment, the detection module 110 detects 505 the corruption using a longitudinal redundancy check algorithm. In an alternate embodiment, the detection module 110 employs a vertical redundancy algorithm to detect 505 corruption of the first data structure.

A removal module 125 removes 510 a first path from a host system 155 to the first data structure. A path module 115 establishes 515 a second path from the host system 155 to a second data structure. In one embodiment, the path module 115 incorporates the second path in a path group without interrupting communications through the paths of the path group.

The re-generation module 120 generates 520 the second data structure to replace the first data structure. In one embodiment, the re-generation module 120 copies a plurality of software instructions from a source to the second data structure. The source may be a CD, hard disk drive, magnetic tape, or the like. The method 500 re-generates a first data structure of a storage device 150 as a second data structure with a path to the host system 155 without affecting other uncorrupted data structures in the storage device 150 or other paths to the data structures.

Figure 6:
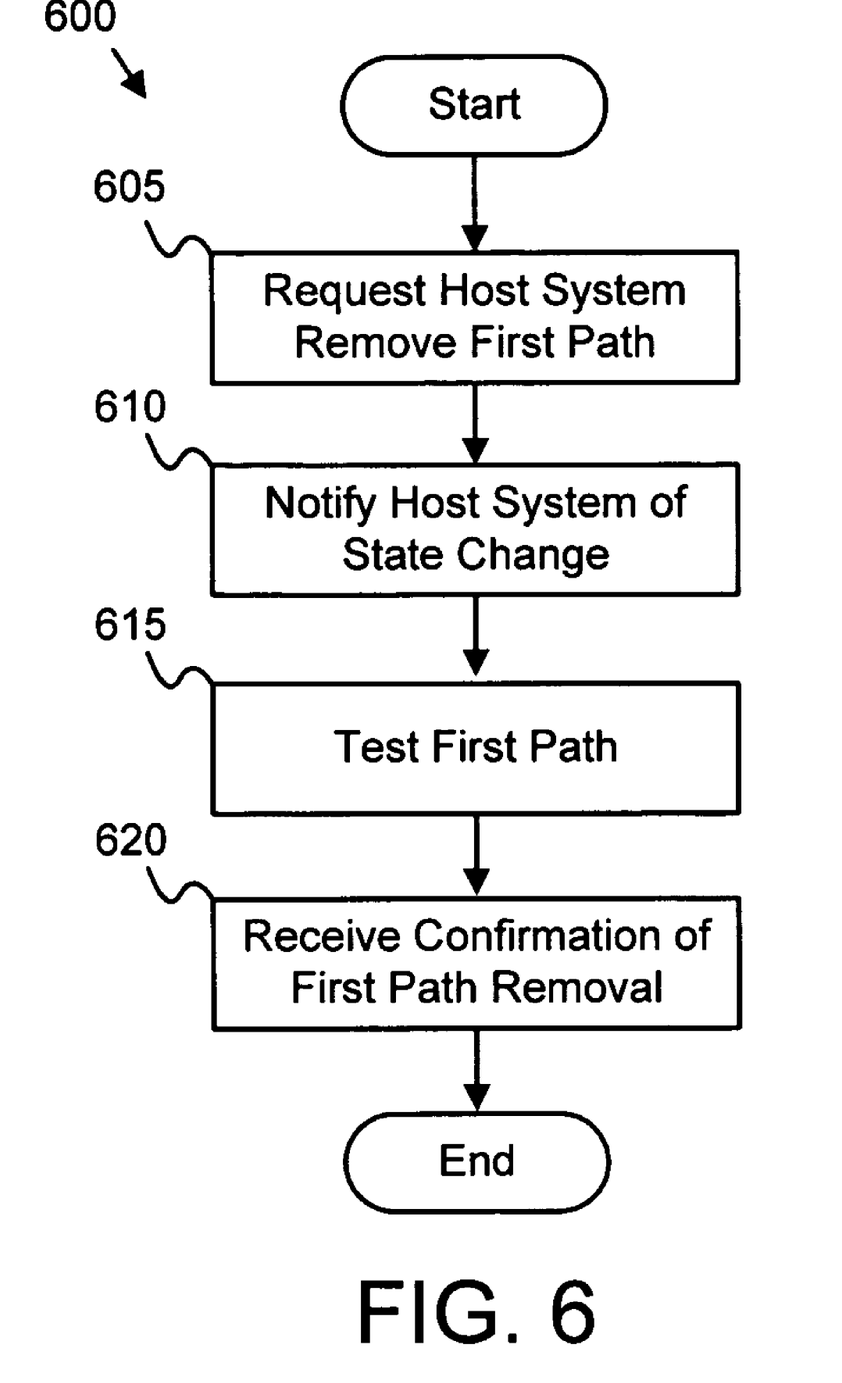
FIG. 6 is a schematic flow chart diagram illustrating one embodiment of a removal method of the present invention.

FIG. 6 is a schematic flow chart diagram illustrating one embodiment of a removal method 600 of the present invention. In one embodiment, the method 600 comprises removing 510 a first path from a host system 155 to the first data structure as described in FIG. 5. A request module 130 requests 605 that a host system 155 remove a first path between the host system 155 and a first data structure of a storage device 150. In one embodiment, the request module 130 communicates a directive to the host system 155 directing the host system 155 to terminate communications over the first path.

The notification module 135 notifies 610 the host system 155 of a state change. In one embodiment, the notification module 135 notifies 610 the host system 155 that the software instructions of the first data structure will not be available. In an alternate embodiment, the notification module 135 notifies 610 the host system 155 that the data structures of the storage device 150 are unavailable until a second replacement data structure is generated.

The verification module 140 verifies the first path is removed by testing 615 the first path and receiving 620 a confirmation of the first path's removal. In one embodiment, the verification module 140 tests 615 the first path by attempting to communicate through the first path. In an alternate embodiment, the verification module 140 tests 615 the first path by directing the host system 155 to attempt to communicate through the first path. The verification module 140 may receive 620 a confirmation from the storage device 150 that the first path is removed. Alternatively, the verification module 140 may receive a confirmation from the host system 155 indicating that the first path is removed. In a certain embodiment, the confirmation is an error message. The method 600 removes 510 the first path from the host system 155 to the first data structure.

Figure 7:
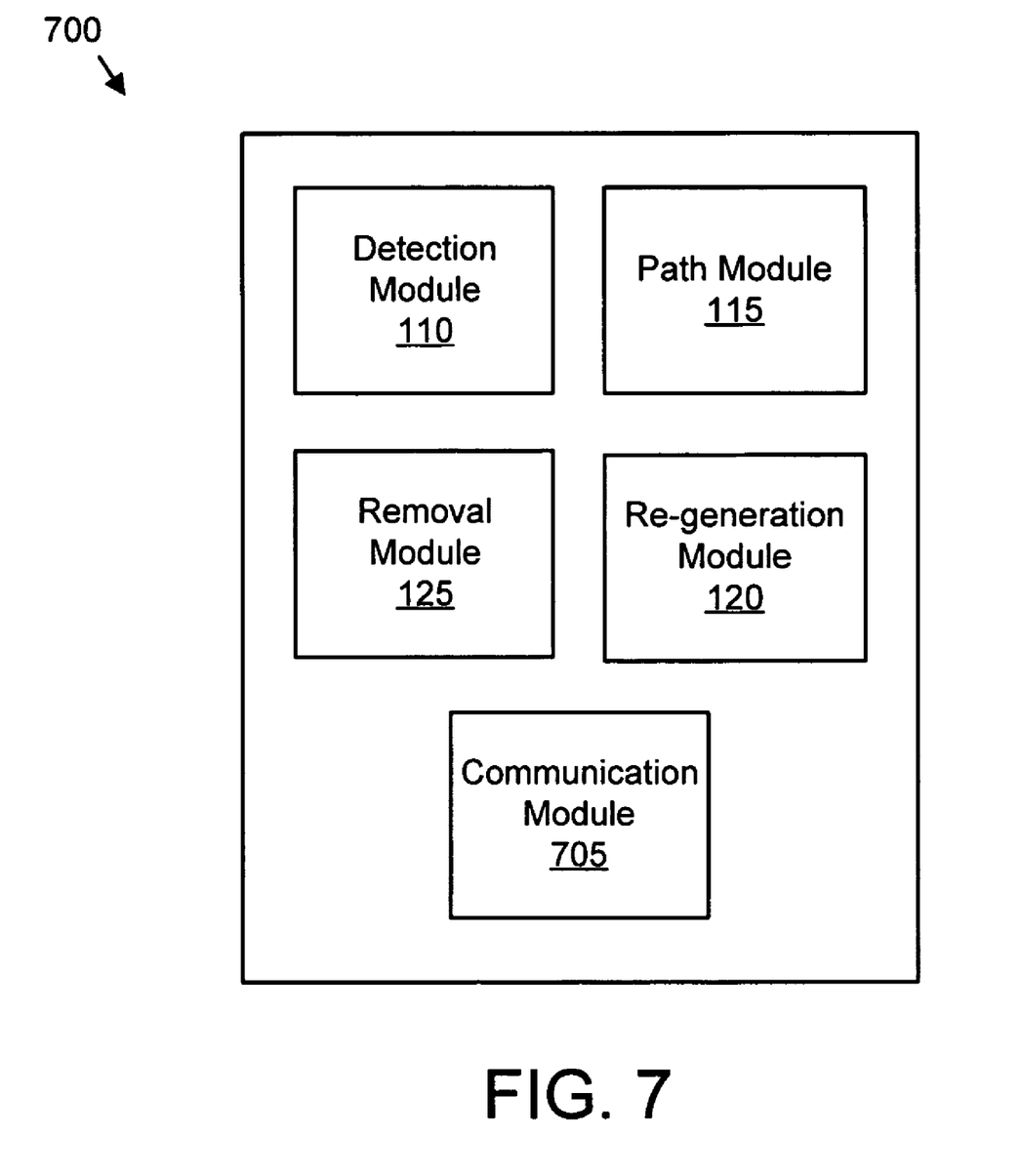
FIG. 7 is a schematic block diagram illustrating one embodiment of a host-based re-generating apparatus of the present invention.

FIG. 7 is a schematic block diagram illustrating one embodiment of a host-based re-generating apparatus 700 of the present invention. The apparatus 700 includes a detection module 110, a removal module 125, a path module 115, a re-generation module 120, and a communication module 705. In the depicted embodiment, the detection module 110, the removal module 125, the path module 115, the re-generation module 120, and the communication module 705 are software programs executing on a host system 155.

The detection module 110 detects 505 corruption of a first data structure stored in a storage device 150. In one embodiment, the detection module 110 reads a plurality of software instructions from the first data structure through the communication module 705 to detect the corruption of the first data structure. The removal module 125 removes 510 the first path from the host system 155 to the first data structure. In one embodiment, the removal module 125 terminates the first path and notifies storage device 150 that the first path is removed.

The path module 115 establishes 515 a second path from the host system 155 to a second data structure in the storage device 150. In one embodiment, the path module 115 directly establishes 515 the second path using software programs of the host system 155. In an alternate embodiment, the path module 115 sends a request through the communication module 705 that the storage device 150 establish the second path. The re-generation module 120 generates 520 the second data structure. In one embodiment, the re-generation module 120 locates the original source of the software instructions of the first data structure and copies the software instructions from the original source to the second data structure.

The present invention is the first to detect a corrupted first data structure and in response, remove a first path to the first data structure, establish a second path to a second data structure and generate the second data structure without interrupting communications with additional data structures through additional paths. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to re-generate a data structure, the apparatus comprising:
  a detection module configured to detect corruption of a first data structure configured to organize software instructions, wherein the first data structure is stored on Random Access Memory (RAM);
  a removal module configured to remove a first path from a host system to the first data structure without affecting communications over other paths of a path group between the host system and other data structures, the removal module comprising a request module configured to request the host system to remove the first path, a notification module configured to notify the host system of a state change, and a verification module configured to verify the first path is removed;
  a path module configured to establish a second path from the host system to a second data structure stored on the RAM and configured to organize the software instructions, incorporating the second path in the path group without interrupting communications through the paths of the path group; and
  a re-generation module configured to generate the second data structure to replace the first data structure.

2. The apparatus of claim 1, wherein the verification module is configured to receive a confirmation indicating that the first path is removed.

3. The apparatus of claim 1, wherein the software instructions are originally loaded to the first data structure from a non-volatile storage device and wherein the re-generation module loads the software instructions from the non-volatile storage device to the second data structure to generate the second data structure.

4. The apparatus of claim 1, wherein the first data structure comprises a redundancy check.

5. The apparatus of claim 4, wherein the redundancy check is a longitudinal redundancy check.

6. The apparatus of claim 4, wherein the detection module tests the first data structure to detect corruption prior to modifying the software instructions of the first data structure.

7. A system to re-generate a data structure, the apparatus comprising:
  a storage device configured to maintain a first data structure configured to organize software instructions, wherein the first data structure is stored on RAM;
  a host system in communication with the storage device through a first path of a path group; and a management module comprising:
- a detection module configured to detect corruption of the first data structure;
- a removal module configured to remove the first path from the host system to the first data structure without affecting communications over other paths of the path group between the host system and other data structures, the removal module comprising a request module configured to request the host system to remove the first path, a notification module configured to notify the host system of a state change, and a verification module configured to verify the first path is removed;
- a path module configured to establish a second path from the host system to a second data structure stored on the RAM and configured to organize the software instructions, incorporating the second path in the path group without interrupting communications through the paths of the path group; and
- a re-generation module configured to generate the second data structure to replace the first data structure.

8. The system of claim 7, further comprising a non-volatile storage device configured to store software instructions wherein the software instructions are originally loaded to the first data structure from the non-volatile storage device and wherein the re-generation module loads the software instructions from the non-volatile storage device to the second data structure to generate the second data structure.

9. The system of claim 7, further comprising a controller module in communication with the host system and the storage device and configured to control the storage device, wherein the host system communicates with the storage device through the controller module.

10. The system of claim 7, wherein the management module is configured as a controller module in communication with the host system and the storage device and configured to control the storage device, wherein the host system communicates with the storage device through the controller module.

11. The system of claim 7, wherein the first data structure comprises a redundancy check.

12. The system of claim 11, wherein the detection module tests the first data structure to detect corruption prior to modifying the software instructions of the first data structure.

13. A program of machine-readable instructions stored on a tangible storage device and executable by a digital processing apparatus to perform operations to re-generate a data structure, the operations comprising:

- detecting corruption in a first data structure configured to organize software instructions, wherein the first data structure is stored on RAM;
- removing a first path from a host system to the first data structure without affecting communications over other paths of a path group between the host system and other data structures, removing the first path comprising requesting the host system to remove the first path, notifying the host system of a state change, and verifying the first path is removed;
- establishing a second path from the host system to a second data structure stored on the RAM and configured to organize the software instructions, incorporating the second path in the path group without interrupting communications through the paths of the path group; and
- generating the second data structure to replace the first data structure.

14. The program of machine-readable instructions of claim 5, wherein verifying the first path is removed further comprises:
- testing the first path; and
- receiving a confirmation indicating that the first path is removed.

15. The program of machine-readable instructions of claim 13, wherein the first data structure comprises a redundancy check.

16. The program of machine-readable instructions of claim 15, wherein the redundancy check is a longitudinal redundancy check.

17. The program of machine-readable instructions of claim 15, the operations further comprising testing the first data structure to detect corruption prior to modifying the software instructions of the first data structure.

* * * * *